(12) United States Patent
Chen

(10) Patent No.: US 8,078,219 B2
(45) Date of Patent: Dec. 13, 2011

(54) SYSTEM AND METHOD FOR SETTING A SIGNAL STRENGTH VALUE FOR A MOBILE DEVICE

(75) Inventor: Kun-Yi Chen, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 373 days.

(21) Appl. No.: 12/538,251

(22) Filed: Aug. 10, 2009

(65) Prior Publication Data

US 2010/0056199 A1 Mar. 4, 2010

(51) Int. Cl.
*H04M 1/00* (2006.01)

(52) U.S. Cl. ............... 455/550.1; 455/115.3; 455/134; 455/161.3; 455/226.2; 455/412.1; 455/67.11

(58) Field of Classification Search ............... 455/115.3, 455/134, 161.3, 226.2, 412.1
See application file for complete search history.

(56) References Cited

U.S. PATENT DOCUMENTS

| | | | |
|---|---|---|---|
| 6,850,743 B2 * | 2/2005 | Davis et al. | 455/161.1 |
| 7,020,178 B2 * | 3/2006 | Mason et al. | 375/136 |

* cited by examiner

*Primary Examiner* — Kamran Afshar
*Assistant Examiner* — Edward Zhang
(74) *Attorney, Agent, or Firm* — Altis Law Group, Inc.

(57) ABSTRACT

A mobile device for setting a signal strength value for the mobile device to receive needed radio signals. The mobile device includes a signal strength value configuring system and a radio signal receiving unit. The signal strength value configuring system is operable to set the signal strength value for the mobile device to receive needed radio signals, utilizing a number of radio station channels detected by the radio signal receiving unit of the mobile device.

12 Claims, 4 Drawing Sheets

SYSTEM AND METHOD FOR SETTING A SIGNAL STRENGTH VALUE FOR A MOBILE DEVICE

BACKGROUND

1. Technical Field

Embodiments of the present disclosure generally relate to techniques of setting signal strength values, and more particularly to a system and method for setting a signal strength value for a mobile device to receive radio signals.

2. Description of Related Art

A mobile device, such as a mobile phone or a radio receiver, for example, may be configured with a default signal strength value to receive radio signals. Each radio signal may correspond to a radio station channel, and the signal strength of each radio signal may be measured in microvolts.

However, a radio station channel of a radio station may be detected by the mobile device when the radio station sends a corresponding radio signal with a certain signal strength value that is stronger than or equals to the default signal strength value. If the default signal strength value is too weak, the mobile device may detect out too much unneeded radio station channels. Conversely, if the default signal strength value is too strong, the mobile device may not detect out enough needed radio station channels.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
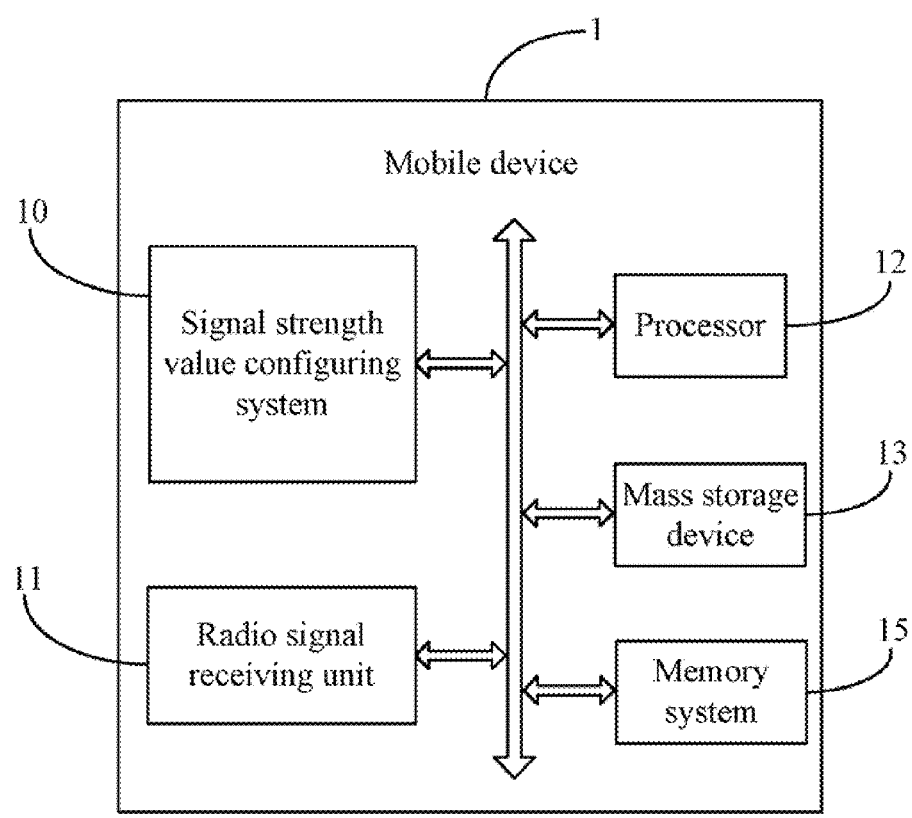
FIG. 1 is a block diagram of one embodiment of a mobile device for setting a signal strength value for the mobile device to receive radio signals.

FIG. 1 is a block diagram of one embodiment of a mobile device 1. The mobile device 1 may be used to set a signal strength value for the mobile device 1 to receive radio signals, and may include a signal strength value configuring system 10 and a radio signal receiving unit 11. The signal strength value configuring system 10 may be used to set the signal strength value for the mobile device 1, utilizing a number of radio station channels detected by the radio signal receiving unit 11 of the mobile device 1.

The mobile device 1 may be a mobile phone, or a radio receiver, for example. In the embodiment, the mobile device 1 may include a memory system 15, such as a random access memory (RAM) for temporary storage of information and/or a read only memory (ROM) for permanent storage of information, and/or a mass storage device 13, such as a hard drive, or optical media storage device. The mass storage device 13 may comprise one or more hard disk drives, optical drive, networked drive, or some combination of various digital storage systems. The mobile device 1 also includes at least one processor 12 for computation. Typically, the modules in the mobile device 1 are in data communication via one or more standards-based bus system. In other embodiments, the standards-based bus system could be peripheral component interconnect (PCI), microchannel, SCSI, industrial standard architecture (ISA) and extended ISA (EISA) architectures, for example. The memory system 15 or the mass storage device 13 may include one or more function modules to implement the signal strength value configuring system 10.

The mobile device 1 is generally controlled and coordinated by operating system software, such as the UNIX, Linux, Windows 95, 98, NT, 2000, XP, Vista, Mac OS X, an embedded operating system, or any other compatible operating systems. In other embodiments, the mobile device 1 may be controlled by a proprietary operating system.

Figure 2:
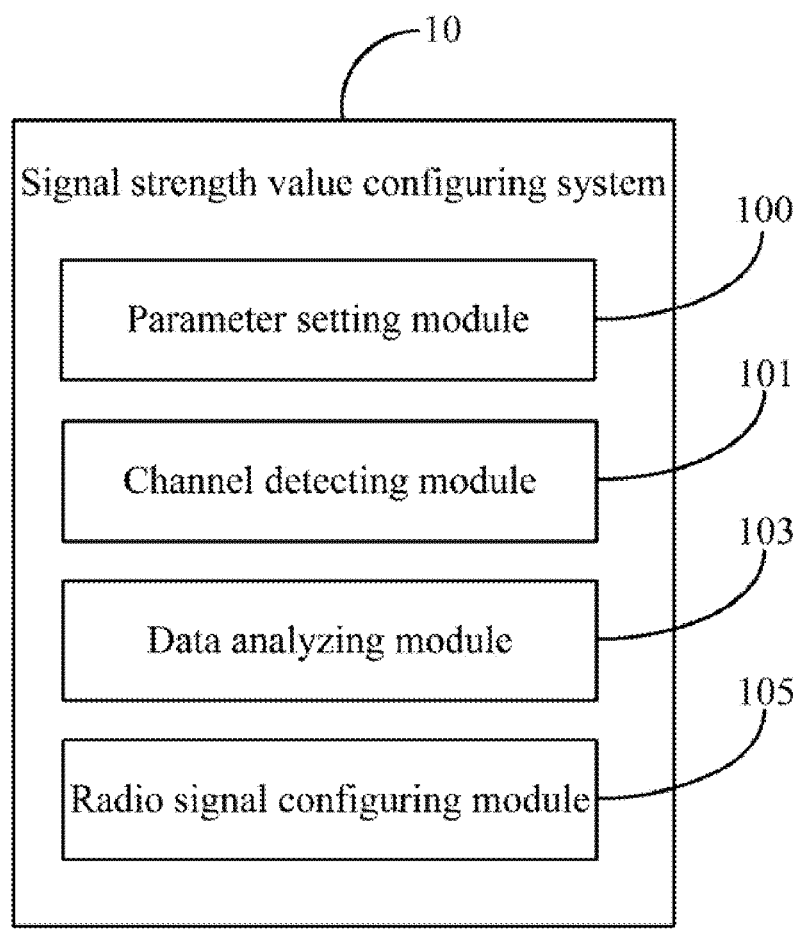
FIG. 2 is a block diagram of one embodiment of function modules included in the mobile device of FIG. 1.

FIG. 2 is a block diagram of the function modules of the signal strength value configuring system 10. In one embodiment, the signal strength value configuring system 10 may include a parameter setting module 100, a channel detecting module 101, a data analyzing module 103, and a radio signal configuring module 105.

The function modules 100, 101, 103, and 105 may be used to implement certain methods for the mobile device 1 described herein. Depending on the embodiment, the functionality described below with reference to certain components and modules of the signal strength value configuring system 10 may be combined into fewer components and modules or further separated into additional components or modules.

The parameter setting module 100 is operable to set a plurality of data range parameters, that include a first data range, a second data range, and a default signal strength value. In one embodiment, the first data range is used to determine an acceptable number of radio station channels, and may be limited by a predetermined channel number X and a channel tolerance A. In particular, the lower limit of the first data range is "X−A," and the upper limit of the first data range is "X+A." In one embodiment, the second data range is used to determine an acceptable signal strength, and may include a predetermined lower limit, such as 12 microvolts, for example, and a predetermined upper limit, such as 25 microvolts, for example.

In one embodiment, the parameter setting module 100 may provide a user interface, such as a graphical user interface (GUI), for a user to set the first data range, the second data range, and the default signal strength value. In another embodiment, the parameter setting module 100 may automatically set the first data range, the second data range, and the default signal strength value when the signal strength value configuring system 10 is executed by the processor 12 of the mobile device 1.

The channel detecting module 101 is operable to control the radio signal receiving unit 11 to detect radio station channels according to a current signal strength value, by utilizing a channel detecting mode. The current signal strength value equals to the default signal strength value when the radio station channels are first detected. The channel detecting module 101 is further operable to count a total number of detected radio station channels. It may be understood that each of detected radio stations sends a radio signal with a certain signal strength value that is stronger than or equals to the current signal strength value. A radio station channel of a radio station may not be detected by the channel detecting module 101, if the radio station sends a radio signal with a certain signal strength value that is weaker than the current signal strength value.

Figure 3:
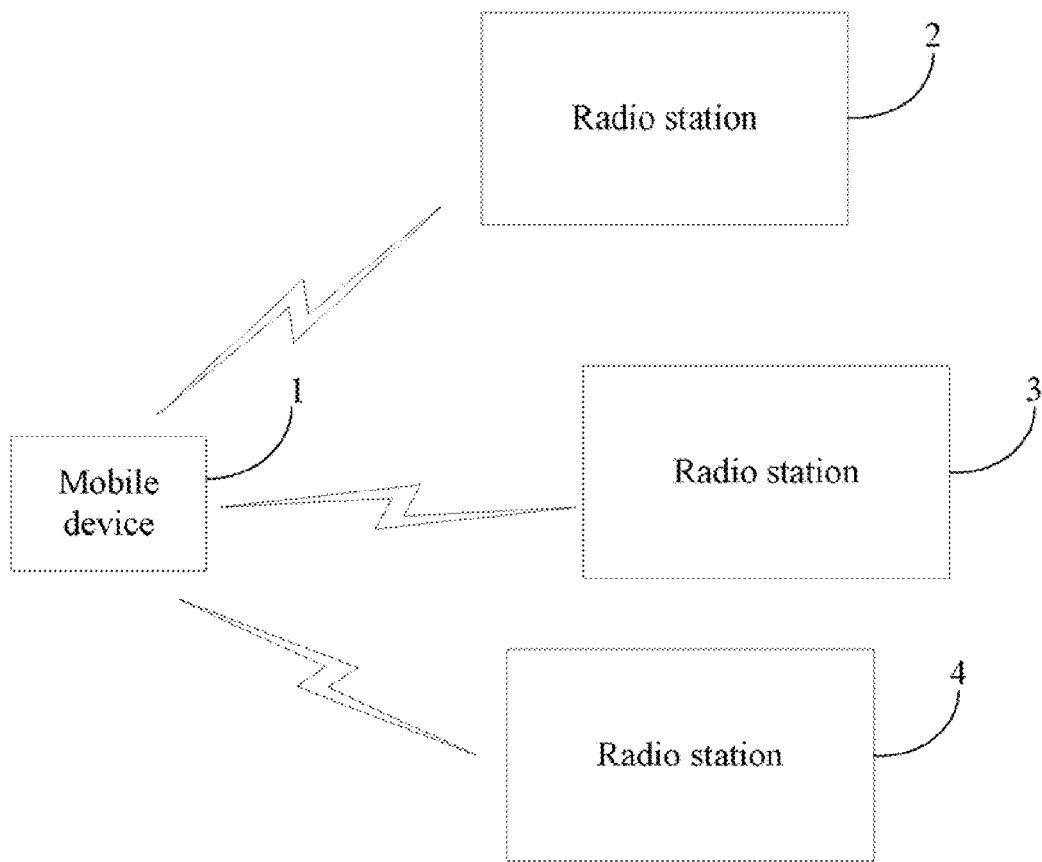
FIG. 3 illustrates one embodiment of a channel detecting mode of the mobile device of FIG. 1.

The channel detecting mode of the channel detecting module 101 of the mobile device 1, is shown in FIG. 3, for example. In one embodiment, a radio station 2 sends a radio signal with a certain signal strength value that is stronger than the current signal strength value. A radio station 3 sends a radio signal with a certain signal strength value that equals to the current signal strength value. A radio station 4 sends a radio signal with a certain signal strength value that is weaker than the current signal strength value. Since the mobile device 1 may detect out the radio signals whose signal strength value is stronger than or equals to the current signal strength value, the radio station channels of the radio station 2 and radio station 3 may be detected out by the channel detecting module 101.

The data analyzing module 103 is operable to analyze whether the counted channel number is within the first data range. The data analyzing module 103 is further operable to subtract a predetermined value (for example, 1 microvolt) from the current signal strength value if the counted channel number is less than a lower limit of the first data range, and add the predetermined value to the current signal strength value if the counted channel number is more than an upper limit of the first data range. In addition, the data analyzing module 103 is operable to analyze whether the current signal strength value is within the second data range after the subtraction or addition.

The radio signal configuring module 105 is operable to set the current signal strength value as a normal signal strength value for the mobile device 1 to receive radio signals, if the counted channel amount is within the first data range.

Figure 4:
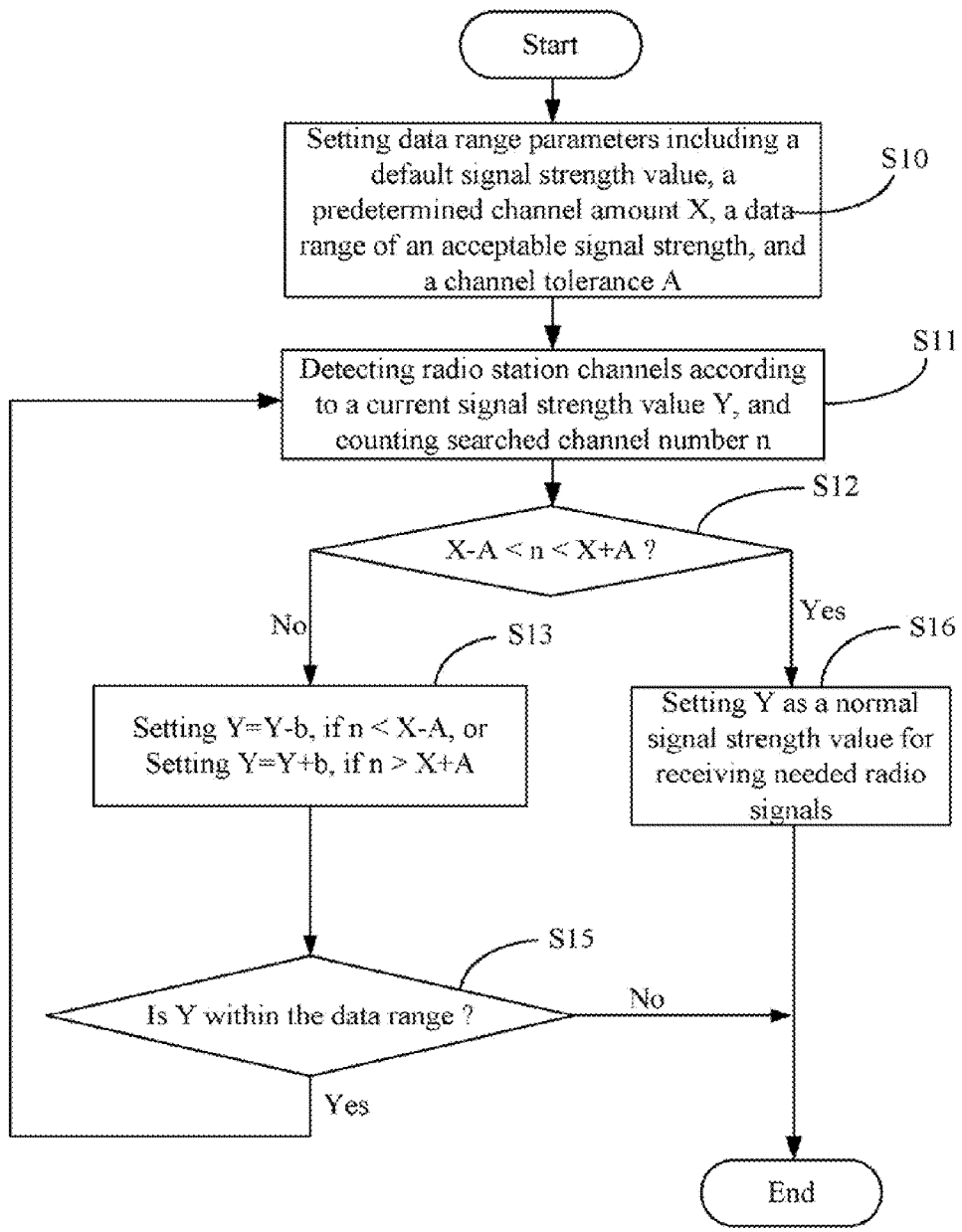
FIG. 4 is a flowchart illustrating one embodiment of a method for setting a signal strength value for a mobile device to receive radio signals.

FIG. 4 is a flowchart illustrating one embodiment of a method for setting a signal strength value for the mobile device 1 to receive radio signals. Depending on the embodiment, additional blocks in the flow of FIG. 4 may be added, others removed, and the ordering of the blocks may be changed.

In block S10, the parameter setting module 100 provides a user interface for a person to set a plurality of data range parameters, or automatically sets the data range parameters. The data range parameters includes a first data range, a second data range, and a default signal strength value. In one embodiment, the first data range is used to determine an acceptable number of radio station channels, and may be limited by a predetermined channel number X and a channel tolerance A. In particular, the lower limit of the first data range is "X−A," and the upper limit of the first data range is "X+A." In one embodiment, the second data range is used to determine an acceptable signal strength, and may include a predetermined lower limit, such as 12 microvolts, for example, and a predetermined upper limit, such as 25 microvolts, for example.

In block S11, the channel detecting module 101 controls the radio signal receiving unit 11 to detect radio station channels according to a current signal strength value, by utilizing a channel detecting mode. Furthermore, the channel detecting module 101 counts a total amount of detected radio station channels. The current signal strength value equals to the default signal strength value when the radio station channels are first detected. The details of the channel detecting mode of the channel detecting module 101 is mentioned above.

In block S12, the data analyzing module 103 analyzes whether the counted channel number is within the first data range.

If the counted channel number is within the first data range, then the procedure goes to block S16 described below. Otherwise, if the counted channel number is beyond the first data range, then the procedure goes to block S13 described below.

In block S13, the data analyzing module 103 subtracts a predetermined value from the current signal strength value if the counted channel number is less than a lower limit of the first data range, or adds the predetermined value to the current signal strength value if the counted channel number is more than an upper limit of the first data range.

In block S15, the data analyzing module 103 analyzes whether the current signal strength value is within the second data range after the subtraction or addition.

If the current signal strength value is within the second data range after the subtraction or addition, then the procedure goes to block S11 described above. Otherwise, if the current signal strength value is beyond the second data range after the subtraction or addition, then the procedure ends.

In block S16, the radio signal configuring module 105 sets the current signal strength value as a normal signal strength value for the mobile device 1 to receive radio signals, if the counted channel number is within the first data range.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A mobile device, comprising:
   a radio signal receiving unit;
   a parameter setting module operable to set data range parameters comprising a first data range of an acceptable number of radio station channels, and a second data range of an acceptable signal strength of radio signals of the radio station channels;
   a channel detecting module operable to control the radio signal receiving unit to detect radio station channels according to a current signal strength value of the radio signal receiving unit, and count a total number of detected radio station channels, wherein each of detected radio stations sends a radio signal with a certain signal strength value that is stronger than or equal to the current signal strength value;
   a data analyzing module operable to analyze whether the counted channel number is within the first data range, subtract a predetermined value from the current signal strength value if the counted channel number is less than a lower limit of the first data range, add the predetermined value to the current signal strength value if the counted channel number is more than an upper limit of the first data range, and analyze whether the current signal strength value is within the second data range after the subtraction or addition;
   a radio signal configuring module operable to set the current signal strength value as a normal signal strength value for the mobile device to receive radio signals, if the counted channel number is within the first data range.

2. The mobile device as described in claim 1, wherein the data range parameters further comprise a default signal strength value of the radio signal receiving unit.

3. The mobile device as described in claim 2, wherein the current signal strength value equals to the default signal strength value when the radio station channels are first detected.

4. The mobile device as described in claim 1, wherein the mobile device is selected from the group consisting of a mobile phone and a radio receiver.

5. A computer-implemented method for setting a signal strength value for a mobile device to receive radio signals, the method comprising:
   (a) setting data range parameters comprising a first data range of an acceptable number of radio station channels, and a second data range of an acceptable signal strength of radio signals of the radio station channels;
   (b) controlling a radio signal receiving unit of the mobile device to detect radio station channels according to a current signal strength value of the radio signal receiving unit, and counting detected radio station channel number, wherein each of detected radio stations sends a radio signal with a certain signal strength value that is stronger than or equal to the current signal strength value;
   (c) analyzing whether the counted channel number is within the first data range, and going to step (g) if the counted channel number is within the first data range, or going to step (d) if the counted channel number is beyond the first data range;
   (d) subtracting a predetermined value from the current signal strength value if the counted channel number is less than a lower limit of the first data range, or adding the predetermined value to the current signal strength value if the counted channel number is more than an upper limit of the first data range;
   (e) analyzing whether the current signal strength value is within the second data range after the subtraction or addition;
   (f) returning to step (b) if the current signal strength value is within the second data range after the subtraction or addition;
   (g) setting the current signal strength value as a normal signal strength value for the mobile device to receive needed radio signals.

6. The method as described in claim 5, wherein the data range parameters further comprise a default signal strength value of the radio signal receiving unit.

7. The method as described in claim 6, wherein the current signal strength value equals to the default signal strength value when the radio station channels are first detected.

8. The method as described in claim 5, wherein the mobile device is selected from the group consisting of a mobile phone and a radio receiver.

9. A storage medium having stored thereon instructions that, when executed by a processor, causing the processor to perform a method for setting a signal strength value for a mobile device to receive radio signals, wherein the method comprises:
   (a) setting data range parameters comprising a first data range of an acceptable number of radio station channels, and a second data range of an acceptable signal strength of radio signals of the radio station channels;
   (b) controlling a radio signal receiving unit of the mobile device to detect radio station channels according to a current signal strength value of the radio signal receiving unit, and counting detected radio station channel number, wherein each of detected radio stations sends a radio signal with a certain signal strength value that is stronger than or equal to the current signal strength value;
   (c) analyzing whether the counted channel number is within the first data range, and going to step (g) if the counted channel number is within the first data range, or going to step (d) if the counted channel number is beyond the first data range;
   (d) subtracting a predetermined value from the current signal strength value if the counted channel number is less than a lower limit of the first data range, or adding the predetermined value to the current signal strength value if the counted channel number is more than an upper limit of the first data range;
   (e) analyzing whether the current signal strength value is within the second data range after the subtraction or addition;
   (f) returning to step (b) if the current signal strength value is within the second data range after the subtraction or addition;
   (g) setting the current signal strength value as a normal signal strength value for the mobile device to receive needed radio signals.

10. The storage medium as described in claim 9, wherein the data range parameters further comprise a default signal strength value of the radio signal receiving unit.

11. The storage medium as described in claim 10, wherein the current signal strength value equals to the default signal strength value when the radio station channels are first detected.

12. The storage medium as described in claim 9, wherein the mobile device is selected from the group consisting of a mobile phone and a radio receiver.

\* \* \* \* \*